(12) United States Patent
Yamashita

(10) Patent No.: US 10,445,480 B2
(45) Date of Patent: *Oct. 15, 2019

(54) USER AUTHENTICATION METHOD, AND USER AUTHENTICATION DEVICE

(71) Applicant: SONY CORPORATION, Tokyo (JP)

(72) Inventor: Kosei Yamashita, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 5 days.

This patent is subject to a terminal disclaimer.

(21) Appl. No.: 14/821,060

(22) Filed: Aug. 7, 2015

(65) Prior Publication Data

US 2015/0347735 A1   Dec. 3, 2015

Related U.S. Application Data

(63) Continuation of application No. 13/557,742, filed on Jul. 25, 2012, now Pat. No. 9,147,053.

(30) Foreign Application Priority Data

Aug. 2, 2011 (JP) .................................. 2011-168897

(51) Int. Cl.
| | |
|---|---|
| *G06F 21/00* | (2013.01) |
| *G06F 21/32* | (2013.01) |
| *H04S 5/00* | (2006.01) |
| *G06F 21/31* | (2013.01) |
| *G10L 17/22* | (2013.01) |

(52) U.S. Cl.
CPC .............. *G06F 21/32* (2013.01); *G06F 21/31* (2013.01); *H04S 5/00* (2013.01); *G06F 2221/2111* (2013.01); *G10L 17/22* (2013.01); *H04S 2420/01* (2013.01)

(58) Field of Classification Search
CPC .. G06F 21/31; G06F 21/32; G06F 2221/2111; H04S 5/00; H04S 2420/01; G10L 17/22; H04L 63/0861
See application file for complete search history.

(56) References Cited

U.S. PATENT DOCUMENTS

| | | | |
|---|---|---|---|
| 2002/0057805 A1* | 5/2002 | Kato ........................ | G06K 9/00 381/56 |
| 2008/0253578 A1 | 10/2008 | Breebaart et al. | |
| 2010/0241256 A1* | 9/2010 | Goldstein ............... | H04R 5/04 700/94 |

(Continued)

OTHER PUBLICATIONS

Wikipedia, "Head-related transfer function", Sep. 10, 2010, Wikipedia, the free encyclopedia, pp. 1-4.

(Continued)

*Primary Examiner* — Joseph P Hirl
*Assistant Examiner* — Chi D Nguy
(74) *Attorney, Agent, or Firm* — Chip Law Group

(57) ABSTRACT

Provided is a user authentication method including reproducing sound data of which a sound source in a first position of a space around a user is virtually localized using a Head-Related Transfer Function (HRTF) of the user toward the user, acquiring a second position of the space around the user, the second position being estimated by the user who has listened to the reproduced sound data as a position of the sound source; and authenticating the user according to a coincidence between the first position and the second position.

18 Claims, 18 Drawing Sheets

(56) References Cited

U.S. PATENT DOCUMENTS

2011/0314530 A1* 12/2011 Donaldson .............. G06F 21/83
  726/7
2012/0093320 A1   4/2012 Flaks et al.
2012/0254940 A1* 10/2012 Raper ................ G06Q 20/4014
  726/3
2013/0182855 A1*  7/2013 Choi ...................... H04R 25/30
  381/23.1

OTHER PUBLICATIONS

Kenji Ozawa and Tomohiro Sato, Learning to Remediate Sound Localization in the Median Plane Using a Virtual Auditory Display, AES 40th International Conference, Tokyo, Japan, Oct. 8-10, pp. 1-6.

* cited by examiner

USER AUTHENTICATION METHOD, AND USER AUTHENTICATION DEVICE

CROSS-REFERENCE TO RELATED APPLICATIONS

The present application is a continuation application of U.S. patent application Ser. No. 13/557,742 filed Jul. 25, 2012, which claims the benefit of Japanese Priority Patent Application JP 2011-168897 filed on Aug. 2, 2011, the entire contents of which are incorporated herein by reference.

BACKGROUND

The present disclosure relates to a user authentication method, a user authentication device, and a program.

Living body authentication is a method of authenticating users using living body information on the users instead of passwords or magnetic cards. As examples of the living body authentication, vein authentication and fingerprint authentication as disclosed in Japanese Laid-Open Patent Publication No. 2008-165742 and iris authentication as disclosed in Japanese Laid-Open Patent Publication No. 2001-34754 are well known.

In recent years, such living body authentications are becoming widespread as a user authentication method in which the possibility of the user himself or herself not being authenticated due to forgetfulness or loss or a third party pretending to be the user and being illegally authenticated due to information leakage or theft is low.

SUMMARY

In the living body authentication such as vein authentication, fingerprint authentication, and iris authentication disclosed in Japanese Laid-Open Patent Publication No. 2008-165742 and Japanese Laid-Open Patent Publication No. 2001-34754, a vein pattern or fingerprint or an iris pattern is acquired in advance as templates and then held. In this manner, there are cases in which users feel psychological resistance, such as in fingerprint collection, with regard to collecting physical shapes of the individual users as data.

In addition, the possibility of duplicating even the living body information such as in a conspiracy between the user and a third party is not zero. Further, when the template information acquired in advance is leaked for whatever reason, the safety may be greatly lowered due to the template duplication.

The present disclosure is thus made to propose a novel and improved user authentication method, a user authentication device, and a program that are capable of implementing more effective living body authentication.

According to an embodiment of the present disclosure, there is provided a user authentication method which includes: reproducing sound data of which a sound source in a first position of a space around a user is virtually localized using a Head-Related Transfer Function (HRTF) of the user toward the user; acquiring a second position of the space around the user and estimated by the user who has listened to the reproduced sound data as a position of the sound source; and authenticating the user according to a coincidence between the first position and the second position.

According to another embodiment of the present disclosure, there is provided a user authentication device which includes: a reproduction unit configured to reproduce sound data of which a sound source in a first position of a space around a user is virtually localized using an HRTF of the user toward the user; a response acquisition unit configured to acquire a second position of the space around the user, the second position being estimated by the user who has listened to the reproduced sound data as a position of the sound source; and an authentication unit configured to authenticate the user according to a coincidence between the first position and the second position.

According to another embodiment of the present disclosure, there is provided a program for causing a computer to execute: a function of reproducing sound data of which a sound source in a first position of a space around a user is virtually localized using an HRTF of the user toward the user; a function of acquiring a second position of the space around the user, the second position being estimated by the user who has listened to the reproduced sound data as a position of the sound source; and a function of authenticating the user according to a coincidence between the first position and the second position.

According to the present disclosure, since the HRTF that is not a direct physical shape representation of an individual user is used as a template, psychological resistance of the user is relatively small. In addition, since estimation of a sound source position using the HRTF is an ability of the individual user, the safety is not easily lowered even when the HRTF of the template is duplicated or leaked.

According to the embodiments of the present disclosure described above, the living body authentication can be implemented more effectively.

DETAILED DESCRIPTION OF THE EMBODIMENT(S)

Figure 1:
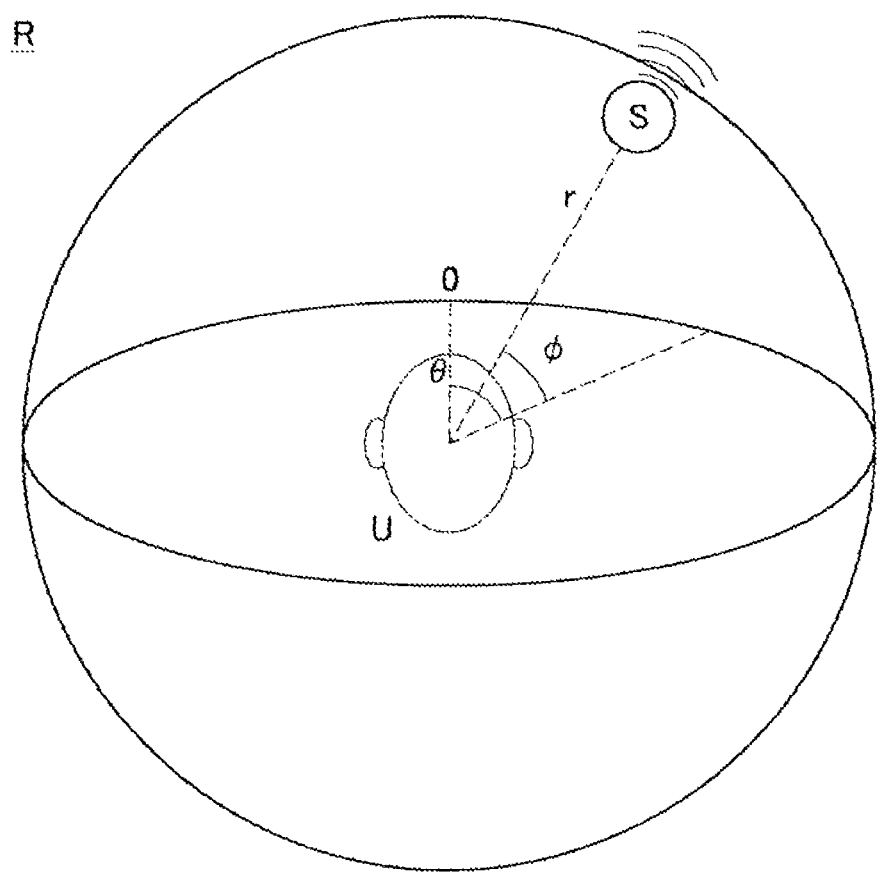
FIG. 1 is a diagram illustrating a sound source in a stereophonic space.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order:

1. Basic idea of user authentication using HRTF
2. Embodiments of present disclosure
2-1. First embodiment (Example of binaural reproduction)
2-2. Second embodiment (Example of transaural reproduction)
2-3. Third embodiment (Example of using terminal device for response)
2-4. Fourth embodiment (Example of authenticating user of terminal device)
3. Supplement

Basic Idea of User Authentication Using HRTF

In the embodiments of the present disclosure that will be described below, users are authenticated using HRTF. First, a basic idea of the user authentication using this HRTF will be described with reference to FIGS. 1 to 6.

(HRTF)

FIG. 1 is a diagram illustrating a sound source in a stereophonic space.

A stereophonic space R is a space around a user U that is a listener, and has a sound source S. Hereinafter, a position of the sound source S is represented using a radius vector r and declination angles θ and φ in polar coordinates of which a position of the user U is the origin. The position of the user U is exactly a middle point of a line segment connecting right and left ears of the user U. The radius vector r is a distance from the middle point to the position of the sound source S. In addition, the declination angle θ is an angle formed by a front direction of the user U and a direction of the sound source S in a horizontal plane. The declination angle φ is an angle formed by a horizontal plane including the position of the user U and the direction of the sound source S in a vertical plane.

Figure 2:
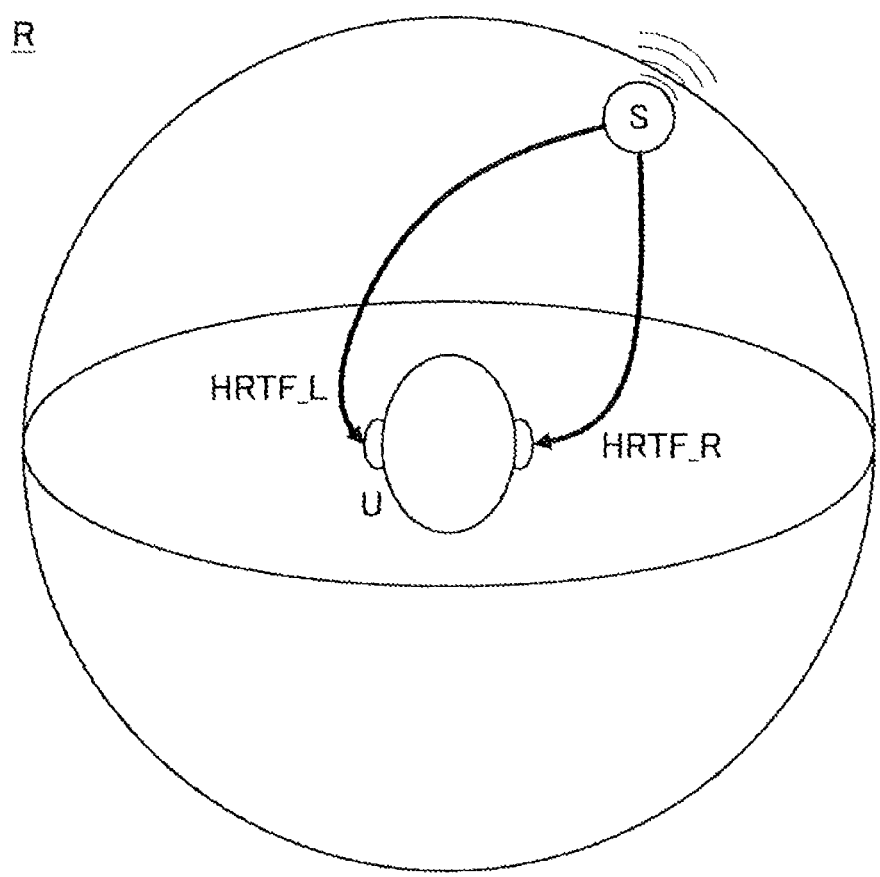
FIG. 2 is a diagram illustrating an HRTF in a stereophonic space.

FIG. 2 is a diagram illustrating the HRTF in the stereophonic space.

Here, in a sound wave (hereinafter, also referred to as a listening sound) reaching an eardrum of the user U, a specific frequency component of the sound wave (hereinafter, also referred to as an original sound) radiated from the sound source S is emphasized or attenuated due to reflection and diffraction at the head or ears of the user U. Since processes of which the original sound is reflected or diffracted are different at right and left ears of the user U, frequency components of the listening sound are different. In addition, since distances from the sound source S are different at the right and left ears of the user U, phases of the listening sound may also be different.

In this case, the change from the original sound to the listening sound is represented as a transfer function, which is an HRTF. In particular, the HRTF strongly depends on a head shape of the user U, an auricle shape, an external auditory meatus shape, an acoustic impedance of the skin, and so forth. That is, the HRTF is a function different for each user. Further, the HRTF is also different because of the position of the sound source S in the stereophonic space R.

In the drawings, it is shown that the sound wave from the sound source S is changed to HRTF_L and an HRTF_R and reaches the left ear and the right ear, respectively. As described above, the HRTF is specific for each user or is different by the position of the sound source S. Accordingly, the HRTF_L and HRTF_R may be represented as the HRTF_L (U, r, θ, φ) and HRTF_R (U, r, θ, φ) that are functions depending on the user U, and the radius vector r and the declination angles θ and φ indicating the position of the sound source S.

A brain that is the sensory center of the user U recognizes the relation between the position of the sound source S and the HRTF as an empirical rule. This enables the user U to recognize the position (r, θ, φ) of the sound source S with the listening sound changed to the HRTF_L (U, r, θ, φ) and HRTF_R (U, r, θ, φ).

The HRTF represents the transfer function between the original sound and the listening sound in a frequency domain. When this HRTF is subjected to an inverse discrete Fourier transform (IDFT), a Head-Related Impulse Response (HRIR) is obtained. The HRIR represents the transfer function between the original sound and the listening sound in a time domain, and is included in the HRTF in a broad sense. In a similar way to the HRTF, the HRIR is different for each of the left and right ears, and may also be represented as the HRIR_L (U, r, θ, φ) and HRIR_R (U, r, θ, φ) depending on the user U, the radius vector r, and the declination angles θ and φ.

Figure 3:
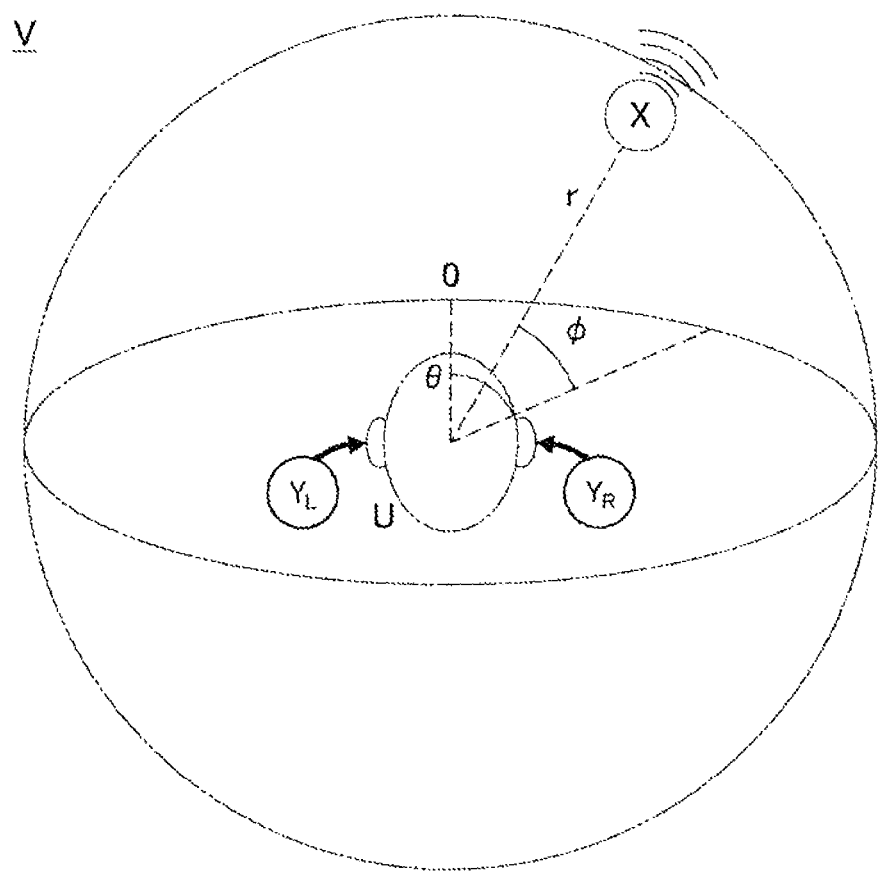
FIG. 3 is a diagram illustrating reproduction of a virtual sound source.

FIG. 3 is a diagram illustrating reproduction of a virtual sound source.

The stereophonic space V is a virtual space recognized as a space around the user U that is a listener. When the measured HRIR_L (U, r, θ, φ) and HRIR_R (U, r, θ, φ) are convoluted to the original sound X, the original sound X is changed in a similar way to the listening sound that is radiated from the sound source S in a position (r, θ, φ) of the actual stereophonic space R to reach the eardrum of the user U. Therefore, when the convoluted sound wave is radiated from the vicinity of the eardrum of the user U, the user perceives the sound source located in the position (r, θ, φ) of the virtual stereophonic space V. This can also be said to be a kind of acoustic illusion. In this case, an output signal $Y_L$ to the left ear and an output signal $Y_R$ to the right ear of the user are expressed as in equations 1 and 2 below. In addition, "*" indicates a convolution operation.

$$Y_L = X * HRIR\_L(U, r, \theta, \varphi) \quad \text{equation 1}$$

$$Y_R = X * HRIR\_R(U, r, \theta, \varphi) \quad \text{equation 2}$$

The HRIR of the user U is obtained by reproducing an impulse signal or a Time Stretched Pulse (TSP) signal, or the like as the sound source S in the actual acoustic space R, picking up the listening sound with microphones worn on left and right ears of the user U to measure the HRTF_L and HRTF_R in the frequency domain, and causing the measured HRTFs to be subjected to the IDFT. In addition, it is possible to directly obtain the HRIR in the time domain from the measured impulse response signal.

As described above, since the HRIR depends on the radius vector r and the declination angles θ and φ indicating the position of the sound source S, the HRIR is preferably measured in each position in which there is a possibility that the sound source S is located. For example, the HRIR is considered to be measured for all combinations of the declination angles θ and φ by fixing the radius vector r to the sound source S to a predetermined distance such as 1 m or the like while changing the declination angle θ or φ per 1°. Although the minimum resolution of the azimuth angle also depends on the direction, the minimum resolution recognized by hearing is about 1°, and it is thus possible to reproduce the virtual sound source in an arbitrary position at a distance r from the user U in the stereophonic space V by measuring the HRIR in an observation point on a mesh of which the declination angles θ and φ are changed per 1°.

In addition, for example, an earphone, a headphone, or the like is employed for radiating the sound wave from a vicinity of the eardrum of the user U. In this case, it is possible to cause the user U to exactly perceive the position of the sound source by applying correction of a transfer characteristic of an external auditory meatus in consideration of a wearing position of the earphone or the headphone, correction of an acoustic characteristic of a speaker driver of the earphone or the headphone, and so forth. In addition, a transaural system that will be described later may be employed for radiating the sound wave toward the vicinity of the eardrum of the user U.

Figure 4:
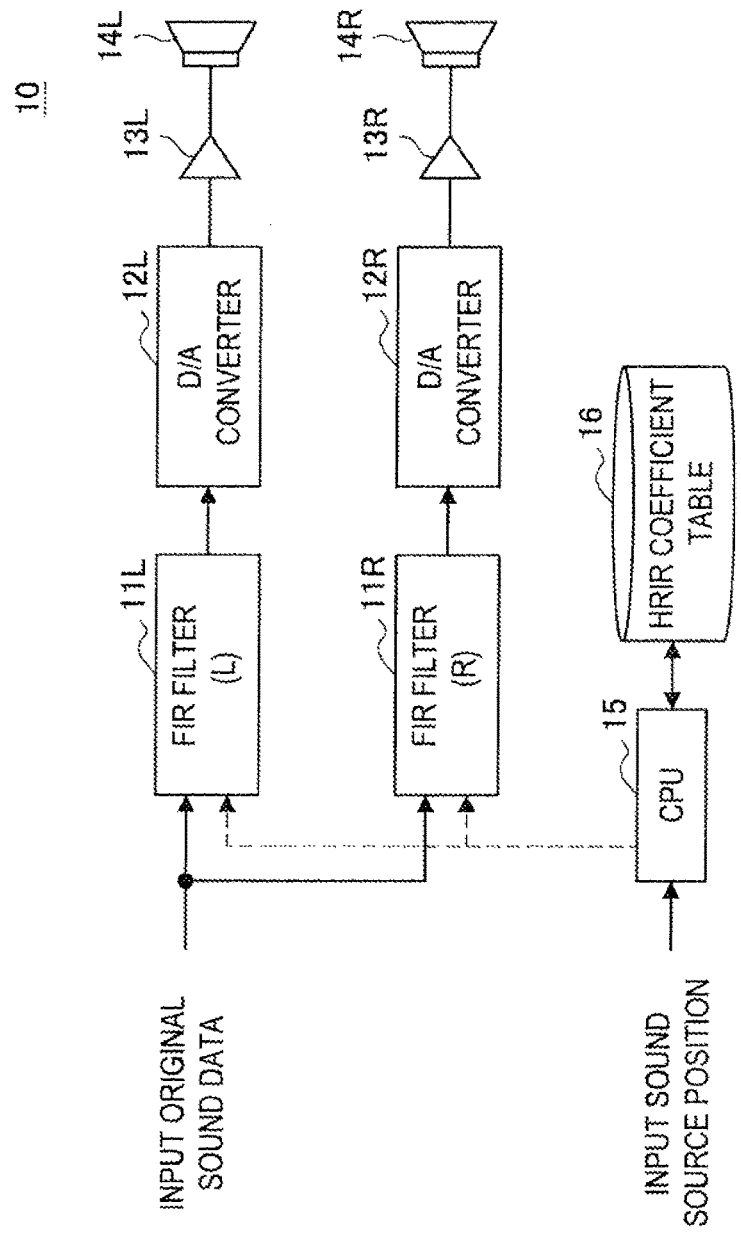
FIG. 4 is a diagram illustrating an example of a configuration of a reproduction device for reproducing a virtual sound source.

FIG. 4 is a diagram illustrating an example of a configuration of a device for reproducing a virtual sound source.

In the device 10, the input original data (monaural) is convoluted with the HRIR_L or the HRIR_R by the left and right Finite Impulse Response (FIR) filters 11L and 11R. For example, the original sound data is input as a digital signal having a sampling frequency of 44.1 kHz and a quantization bit number of 16 bits. Here, when the tap length of the HRIR coefficient is 512 samples, convolution using the FIR filters 11L and 11R leads to a sum-of-product operation process of 512 taps. The FIR filter may be mounted as operation hardware such as a Digital Signal Processor (DSP) or may be mounted as a software signal process using a Central Processing Unit (CPU).

As a result of the convolution of the FIR filters 11L and 11R, an output signal $Y_L$ to the left ear and an output signal $Y_R$ to the right ear of the user are obtained. These signals are converted to analog signals by D/A converters 12L and 12R, amplified by amplifiers 13L and 13R, and output to the user U that is a listener from speakers 14L and 14R, respectively. As will be described later, the speakers 14L and 14R are speakers having a function of outputting respective voices to left and right ears of the user U such as speakers included in the earphone or headphone, or included in the transaural system.

Here, the FIR filters 11L and 11R are controlled by a CPU 15. The CPU 15 acquires HRIR coefficients from an HRIR coefficient table 16 stored in a storage device or the like in response to the input position of the sound source. For example, the HRIR coefficients are linked to the user ID for identifying the user U, and are stored in the HRIR_L and HRIR_R for each combination of the radius vector r and the declination angles θ and φ and indicating the position of the sound source S, respectively.

(User Authentication Using HRTF)

As described above, the HRTF and the HRIR are functions of each user. The user U empirically learns how the original sound radiated from the sound source S in the position (r, θ, φ) is changed to the listening sound by virtue of the HRTF of the user himself or herself. This learning enables the user U to recognize the position of the sound source S from the listening sound.

Accordingly, for example, even when the HRIR_L (U', r, θ, φ) and HRIR_R (U', r, θ, φ) of another user U' are convoluted to the original sound X and then radiated from the proximity of the eardrum of the user U at the time of reproducing the sound source in the virtual stereophonic space V shown in FIG. 3, the user does not perceive the sound source located in the position (r, θ, φ) of the virtual stereophonic space V. This is because the change of the original sound X due to the HRTF of the other user U' is different from the change of the HRTF of the user U himself or herself that is empirically learned by the user U. In this way, it is known in general that individual differences associated with the perception of localizing the virtual sound source are significant.

When the original sound X is convoluted by the HRIR calculated from the HRTF that does not belong to the user U and then presented to the user U, the position of the sound source is not exactly perceived as described above. In particular, it is very difficult to precisely localize the sound source in an arbitrary position of the front (front localization) or up and down (up and down localization). In this case, it is known that the sound source is wrongly perceived to be localized in a position such as inside the head of the user U (localization inside the head) or in the rear of the user U (rear localization).

On the other hand, when the HRIR_L (U, r, θ, φ) and HRIR_R (U, r, θ, φ) of the user U are convoluted to the original sound X and then presented, only the user U can exactly perceive that the sound source is in the position (r, θ, φ).

The basic idea of the user authentication using the HRTF is based on the discovery described above. That is, the user authentication using the HRTF is that the user U is authenticated using the HRTF such as HRIR of the user U as a template and exactly estimating the position of the sound source that has been virtually generated using the HRTF. In this authentication, for example, the user U is authenticated as the exact user himself or herself only when the position of the sound source that has been virtually generated is exactly estimated to be in a predetermined minute error range.

Figure 5:
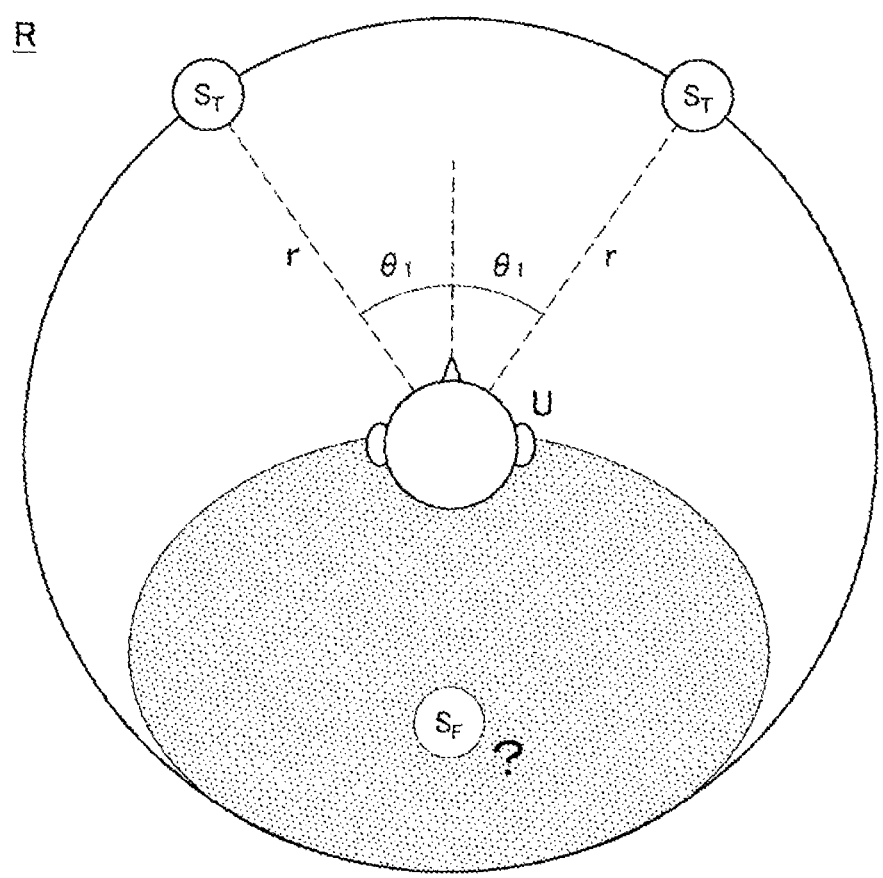
FIG. 5 is a diagram conceptually illustrating an example of the user authentication using the HRTF.

FIG. 5 is a diagram conceptually illustrating an example of the user authentication using the HRTF.

For example, the sound source $S_T$ in the position (r, $θ_1$, 0) in front of the user U is virtually reproduced by convoluting the HRIR_L (U, r, $θ_1$, 0) and HRIR_R (U, r, $θ_1$, 0) to the original sound X and then presented to a listener. In this case, when the listener is the user U, the position of the sound source $S_T$ can be precisely perceived. On the other hand, when the listener is not the user U, it is difficult to precisely perceive the position of the sound source $S_T$. For example, the sound source is wrongly perceived to be a sound source $S_F$ in the rear of the listener. It is thus possible to accurately authenticate the user U when the position of the sound source $S_T$ in front of the user U is estimated.

Figure 6:
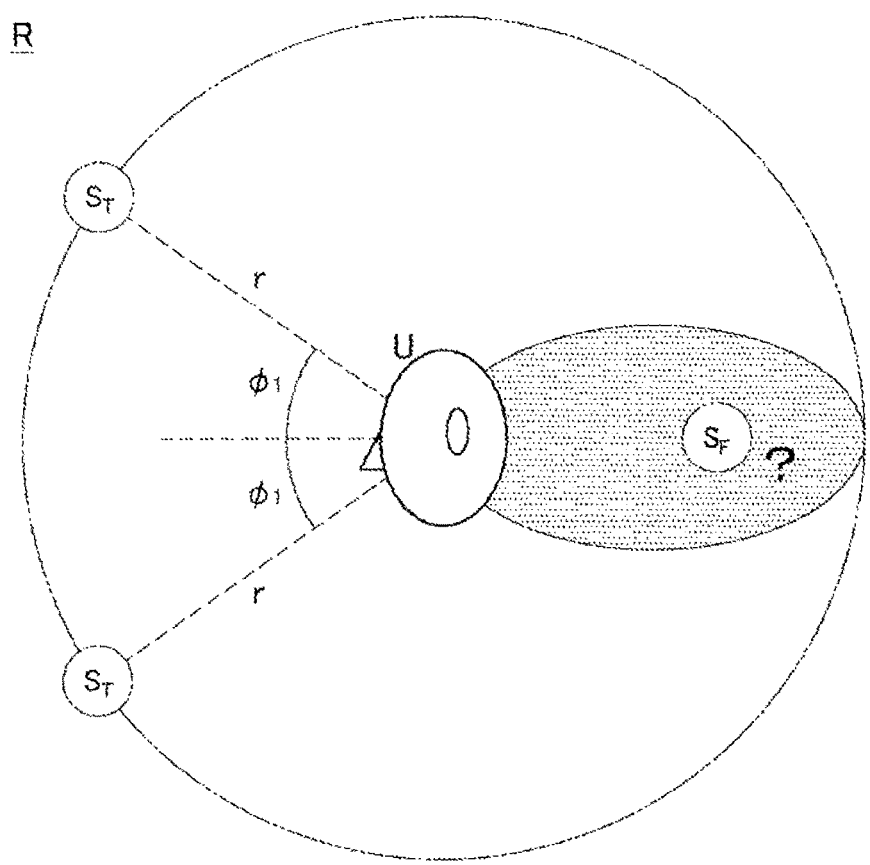
FIG. 6 is a diagram conceptually illustrating another example of the user authentication using the HRTF.

FIG. 6 is a diagram conceptually illustrating another example of the user authentication using the HRTF.

As described above, when the HRIR calculated from the HRTF that does not belong to the user U himself or herself is convoluted to the original sound X and then presented to the user U, the sound source is wrongly perceived to be localized in a position such as inside the head of the user U or in the rear of the user U. The range of which the wrong positions are distributed is very narrow in up and down directions of the user U. That is, when the HRIR calculated from the HRTF that does not belong to the user himself or herself is convoluted to the original sound X and then presented, it is very difficult for the listener to identify the height of the sound source.

For example, the sound source $S_T$ in the position (r, 0, $\varphi_1$) in front of the user U is virtually reproduced by convoluting the HRIR_L (U, r, 0, $\varphi_1$) and HRIR_R (U, r, 0, $\varphi_1$) to the original sound X and then presented to the listener. In this case, when the listener is the user U, the position of the sound source $S_T$ can be precisely perceived. On the other hand, when the listener is not the user U, it is difficult to precisely perceive the position of the sound source $S_T$. The sound source $S_F$ is thus wrongly perceived at the same height as the listener in the rear of the listener in many cases. Accordingly, when any one position of the sound source $S_T$ among a plurality of positions having different heights from the user U is estimated, the user U can be accurately authenticated.

2. Embodiments of Present Disclosure

Next, some examples of embodiments of authenticating the user using the basic idea described above will be described.

2-1, First Embodiment

First, the first embodiment of the present disclosure will be described with reference to FIGS. 7 to 12. In the present embodiment, a virtual sound source reproduced using the HRTF of the user U is provided to a listener by virtue of binaural reproduction. The listener responds by inputting an estimated position of the sound source using an input device. When the response is correct, the listener is authenticated as the user.

Figure 7:
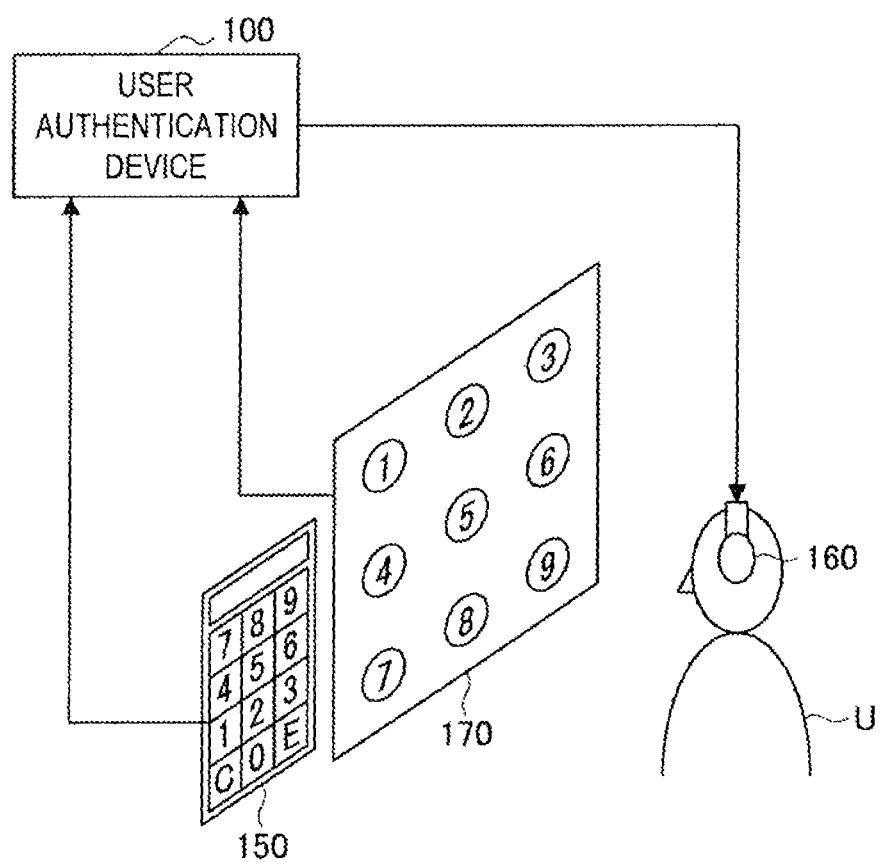
FIG. 7 is a diagram illustrating a configuration of a device used for user authentication in a first embodiment of the present disclosure.

FIG. 7 is a diagram illustrating a configuration of a device used for the user authentication in the first embodiment of the present disclosure.

In the present embodiment, an ID input device 150, a headphone 160, and a response input device 170 are connected to a user authentication device 100. The ID input device 150, the headphone 160, and the response input device 170 are installed in a place at which the user U is to be authenticated, for example, at an entrance of the room in which confidential information is handled. For example, the user U has authority to enter the room, and the HRTF of the user U is measured in advance and registered in the user authentication device 100.

The ID input device 150 is used when the user U inputs his or her own ID. The HRTF of the user U is registered in the user authentication device 100 in association with the user ID, and is read using the user ID acquired by the ID input device 150.

The headphone 160 is used to provide the voice that is generated by the user authentication device 100 and virtually reproduces the sound source to the listener by virtue of binaural reproduction. As described above, by applying the correction in consideration of a wearing position of the headphone 160 or an acoustic characteristic of a speaker driver to the voice, it is possible to cause the user U to more precisely perceive the position of the sound source.

The response input device 170 is used when the position of the sound source estimated by the listener is acquired as a response. As shown in the drawing, the response input device 170 has nine buttons of "1" to "9." The listener selects any one of these buttons, and the position corresponding to the selected button is acquired as a response. In addition, an arrangement of the buttons of the response input device 170 will be described later.

In the present embodiment, the device configuration described above is used to determine whether the position of the sound source virtually reproduced by the listener can be correctly estimated. When the listener can correctly estimate the position of the sound source, the listener is authenticated as the user U, and a process of causing an external device that has acquired the authentication result from the user authentication device 100 to release the lock at the entrance of the room is carried out, for example.

In this way, by using the dedicated input device to acquire the user ID and the response, it is possible to lighten the burden of the user U even when the user U does not carry a magnetic card or the like.

Figure 8:
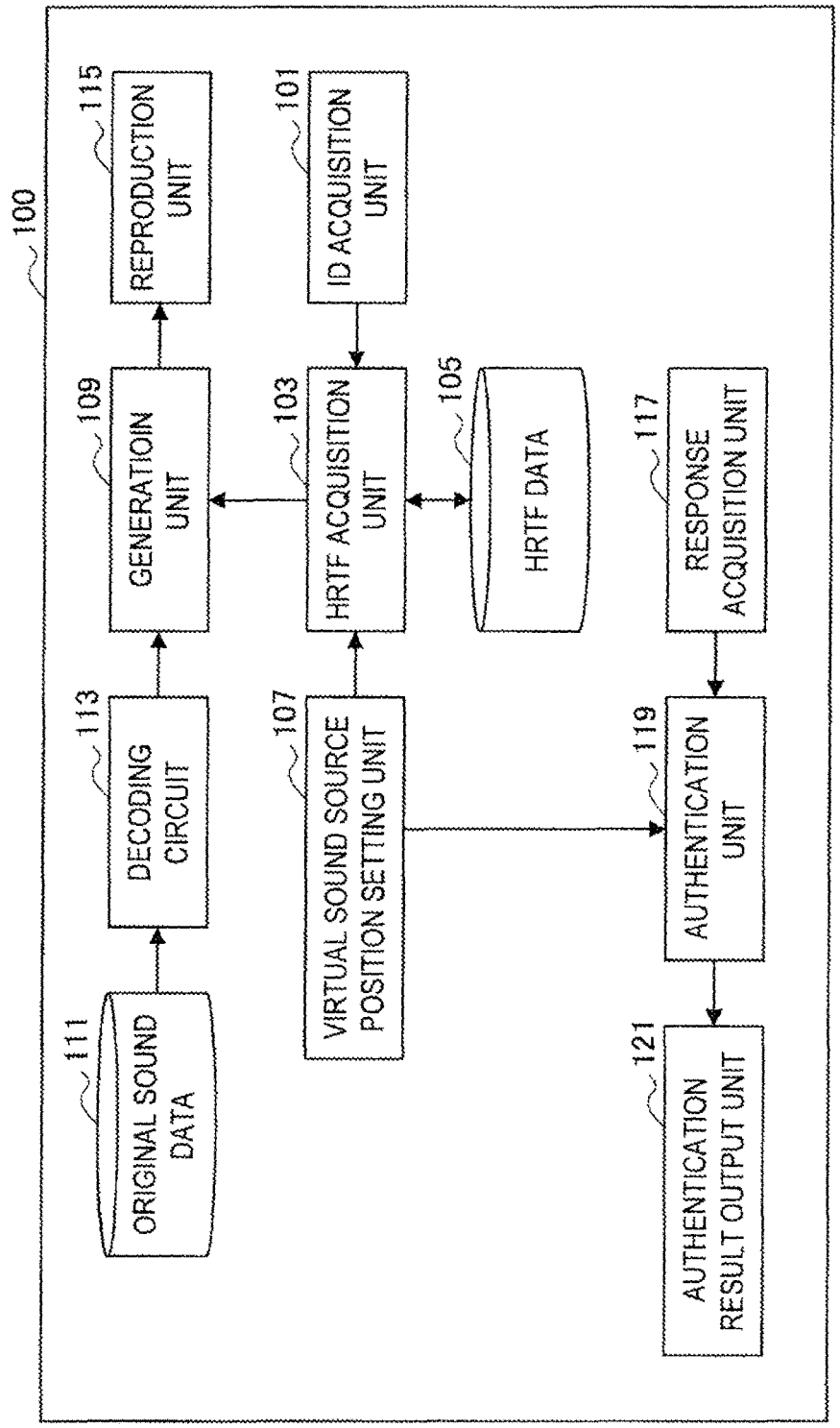
FIG. 8 is a block diagram illustrating a functional configuration of a user authentication device in accordance with the first embodiment of the present disclosure.

FIG. 8 is a block diagram illustrating a functional configuration of the user authentication device in accordance with the first embodiment of the present disclosure.

The user authentication device 100 includes an ID acquisition unit 101, an HRTF acquisition unit 103, a virtual sound source position setting unit 107, a generation unit 109, a decoding circuit 113, a reproduction unit 115, a response acquisition unit 117, an authentication unit 119, and an authentication result output unit 121. In addition, the user authentication device 100 refers to HRTF data 105 and original sound data 111 stored in a storage device or the like.

The ID acquisition unit 101 acquires the user ID of the user U. For example, the ID acquisition unit 101 is an interface connected to the ID input device 150, and acquires information on the user ID input by the listener using the ID input device 150. The ID acquisition unit 101 provides the acquired information on the user ID to the HRTF acquisition unit 103.

The HRTF acquisition unit 103 acquires the HRTF of the user U that is measured in advance. As described above, the HRTF depends on the user U and the position (r, θ, φ) of the sound source S. The HRTF acquisition unit 103 then refers to the HRTF data 105 using the user ID acquired from the ID acquisition unit 101 and the virtual sound source position acquired from the virtual sound source position setting unit 107, and acquires information on the HRTF of the user U that is measured in advance and stored. In this case, the acquired HRTF is, for example, the HRIR. The HRTF acquisition unit 103 provides the acquired HRTF information to the generation unit 109.

The virtual sound source position setting unit 107 randomly sets the position (r, θ, φ) of the virtual sound source. The virtual sound source position setting unit 107 sets an arbitrary position of the virtual stereophonic space V as the virtual sound source position (hereinafter, referred to as a first position). In the present embodiment, since the virtual sound source position is responded to by the selection from nine options, the virtual sound source position setting unit 107 sets any one of the nine positions of the stereophonic space V corresponding to the respective nine options as the virtual sound source position. In addition, a relation between the response options and the virtual sound source position will be described later. The virtual sound source position setting unit 107 provides the information on the set first position to the HRTF acquisition unit 103 and the authentication 119.

As described above, the HRTF acquisition unit 103 acquires the HRTF from the HRTF data 105 on the basis of the user ID acquired by the ID acquisition unit 101 and the first position set by the virtual sound source position setting unit 107. Here, the first position that can be set by the virtual sound source position setting unit 107 is any one of nine positions. For this reason, HRTFs of at least the nine positions are prepared in advance for the user U in the HRTF data 105.

The generation unit 109 generates sound data of which the sound source in the first position of the stereophonic space V is virtually reproduced using the HRTF. The generation unit 109 acquires the information on the HRTF in the first position of the user U from the HRTF acquisition unit 103. The generation unit 109 is implemented using the FIR filter as in the case of the device 10 shown in FIG. 4, for example. The generation unit 109 processes data of the original sound provided from the decoding circuit 113 using the HRTF to generate the sound data of the virtual sound source. The generation unit 109 provides the generated sound data to the reproduction unit 115.

The decoding circuit 113 decodes the original sound data 111. For example, the original sound data 111 is monaural sound data that is MP3 compressed using a sampling frequency of 44.1 kHz and a quantization bit number of 16 bits. The decoding circuit 113 decodes the sound data to a PCM signal and provides the PCM signal to the generation unit 109.

The reproduction unit 115 reproduces the sound data provided from the generation unit 109 toward the listener, that is, the user U to be authenticated. The generation unit 115 is, for example, an interface connected to the headphone 160, and may include a D/A converter or an amplifier. The generation unit 115 provides the sound data to the headphone 160 to be presented to the listener.

The response acquisition unit 117 acquires the position (hereinafter, also referred to as a second position) of the virtual sound source in the stereophonic space V estimated by the listener that has listened to the sound data reproduced by the reproduction unit 115 using the headphone 160 as a response. The response acquisition unit 117 is, for example, an interface connected to the response input device 170, and acquires information on the second position input by the listener using the response input device 170. The response acquisition unit 117 provides the acquired information on the second position to the authentication unit 119.

The authentication unit 119 authenticates the user U in accordance with the coincidence between the first and second positions. The authentication unit 119 acquires the information on the first position from the virtual sound source position setting unit 107 and the information on the second position from the response acquisition unit 117. When the first position and the second position coincide with each other, the authentication unit 119 determines that the listener correctly perceives the virtual sound source position, and authenticates that the listener is the user U. As will be described later, the authentication unit 119 may authenticate the user U by repeating the determination plural times. The authentication unit 119 outputs the authentication result to the authentication result output unit 121.

The authentication result output unit 121 outputs the authentication result. The authentication result output unit 121 is, for example, an interface connected to a device external to the user authentication device 100, and may provide the authentication result to the external device. In the present embodiment, the external device is a locking device or the like that locks an entrance of a room, for example. In the external device, an authentication result from the user authentication device 100 and an authentication result from other authentication device such as an authentication device that authenticates the user U using a password, a magnetic card, living body authentication or the like may be combined to authenticate the user U. In addition, the authentication result output unit 121 may be an interface for outputting the authentication result to other portions within the authentication device 100.

In addition, for example, the HRTF acquisition unit 103, the virtual sound source position setting unit 107, and the authentication unit 119 are implemented by a CPU, a Random Access Memory (RAM), a Read Only Memory (ROM), and so forth.

Figure 9:
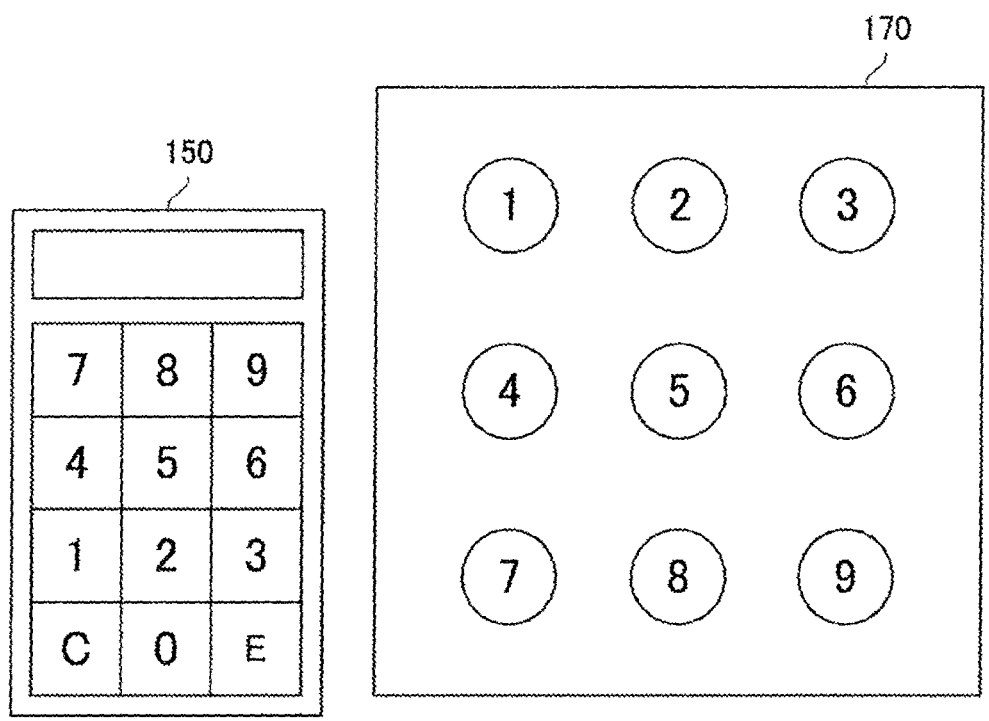
FIG. 9 is a diagram illustrating an example of a device for inputting user IDs and responses in accordance with the first embodiment of the present disclosure.

FIG. 9 is a diagram illustrating an example of a device for inputting user IDs and responses in accordance with the first embodiment of the present disclosure.

In the present embodiment, the ID input device 150 and the response input device 170 are installed on a wall or the like in front of the listener. For example, the ID input device 150 is a device that enables the user ID to be input using a numeric keypad and an enter key. The response input device 170 has the nine buttons as described above, and acquires the response from depression of any of the buttons.

Here, the response input device 170 has a button "5" disposed in the center when seen by the listener facing response input device 170, and buttons "1" to "4" and "6" to "9" disposed in upper, lower, left, right, upper left, upper right, lower left, and lower right portions around the button "5" when seen by the listener, respectively. The positions indicating the respective nine buttons may be a predetermined position group in the stereophonic space V. As described above, the first position and the second position are selected from the position group.

In this way, when the HRTF of the user U is measured on the position at least included in the predetermined position group by selecting the first and second positions from the predetermined position group, measurement on the HRTF becomes favorably simplified. In addition, the response of the user U that estimates the virtual sound source position can be acquired by selection from the choices, and response input and determination on the correct answer become simplified. In addition, the number of positions included in the position group is not limited to nine, and may be any number.

Figure 10:
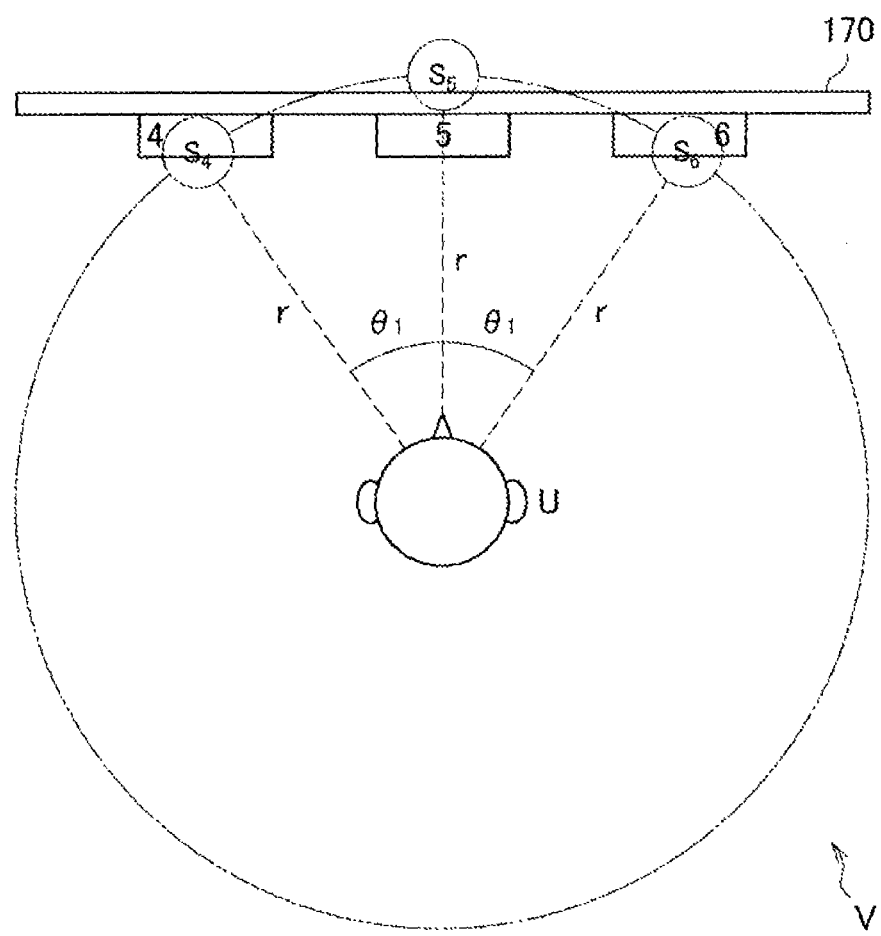
FIG. 10 is a diagram illustrating a horizontal direction arrangement of response buttons in accordance with the first embodiment of the present disclosure.

FIG. 10 is a diagram illustrating horizontal direction arrangement of the response buttons in accordance with the first embodiment of the present disclosure.

In the drawing, a horizontal cross-sectional diagram of the virtual stereophonic space V in the proximity of the listener at the head height of the listener is schematically illustrated. In the present embodiment, the response input device 170 is disposed in a position having a distance r from the front of the listener. The button "5" of the response input device 170 thus corresponds to the sound source $S_5$ in the position (r, 0, 0) of the stereophonic space V. In addition, the button "4" of the response input device 170 corresponds to the sound source $S_4$ in the position (r, $-\theta_1$, 0) of the stereophonic space V, and the button "6" corresponds to the sound source $S_6$ in the position (r, $\theta_1$, 0).

In the illustrated example, any of distances between the sound source $S_4$ and the sound source $S_5$ and between the sound source $S_5$ and the sound source $S_6$ is r×tan $\theta_1$. In this case, a distance to the buttons "4" and "6" of the response input device 170 is a little greater than the distance r. However, for example, when r is about 1 m and $\theta_1$ is about 10°, a difference between the distance to the buttons and the distance r is in a negligible range as an error. When the distance to the buttons "4" and "6" of the response input device 170 is exactly r, a distance from the listener to the response input device 170, that is, a distance to the button "5" may be r×cos θ₁, and distances between the sound source S₄ and the sound source S₅ and between the sound source S₅ and the sound source S₆ may be r×sin θ₁.

Figure 11:
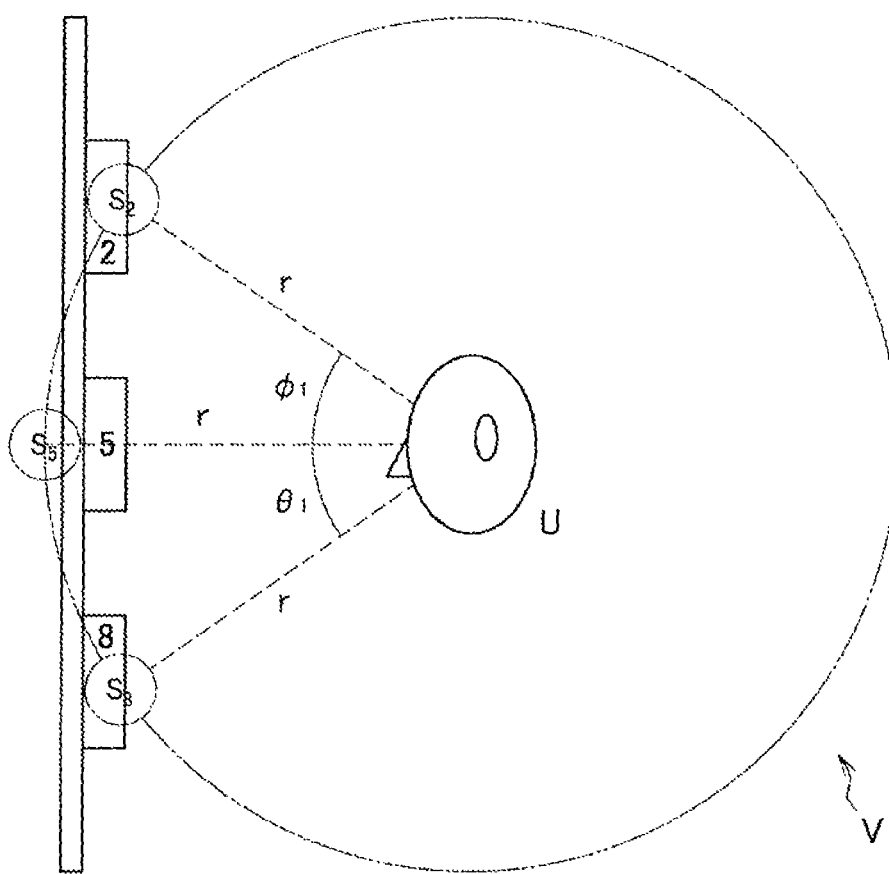
FIG. 11 is a diagram illustrating a vertical direction arrangement of response buttons in accordance with the first embodiment of the present disclosure.

FIG. 11 is a diagram illustrating vertical direction arrangement of response buttons in accordance with the first embodiment of the present disclosure.

In the drawing, a vertical cross-sectional diagram in a front-back direction of the listener is schematically illustrated in the virtual stereophonic space V in the proximity of the listener. As described above, in the present embodiment, the response input device 170 is disposed in a front position having a distance r from the listener, and the button "5" corresponds to the sound source S₅ in a position (r, 0, 0) of the stereophonic space V. In addition, the button "2" of the response input device 170 corresponds to the sound source S₂ in a position (r, 0, φ₁) of the stereophonic space V, and the button "8" corresponds to the sound source S₈ in a position (r, 0, −φ₁).

In the illustrated example, any of distances between the sound source S₈ and the sound source S₅ and between the sound source S₅ and the sound source S₈ is r×tan φ₁. In this case, a distance to the buttons "2" and "8" of the response input device 170 is a little greater than the distance r. However, for example, when r is about 1 m and φ₁) is about 10°, a difference between the distance to the buttons and the distance r is in a negligible range as an error. When a distance to the buttons "2" and "8" of the response input device 170 is exactly r, a distance from the listener to the response input device 170, that is, a distance to the button "5," may be r×cos φ₁, and distances between the sound source S₂ and the sound source S₅ and between the sound source S₅ and the sound source S₈ may be r×sin φ₁.

Positions of sound sources S₁, S₃, S₇, and S₉ not shown in the stereophonic space V and corresponding buttons of the response input device 170 are set in a similar way to the sound sources S₂, S₄ to S₆, and S₈ described above. That is, the sound source S₁ corresponds to the button "1" in the position (r, −θ₁, φ₁). The sound source S₃ corresponds to the button "3" in the position (r, θ₁, φ₁). The sound source S₇ corresponds to the button "7" in the position (r, −θ₁, −φ₁). The sound source S₉ corresponds to the button "9" in the position (r, θ₁, −φ₁).

In addition, in the present embodiment, the HRTF of the user U to be measured in advance is preferably measured in an anechoic space in order to remove an influence of reflection at the wall. However, for example, when a place at which the user U is to be authenticated, that is, a place at which the headphone 160 and the response input device 170 are disposed, is a small room or the like, the HRTF may be measured in an environment in consideration of reflection or absorption of the walls of the room.

Figure 12:
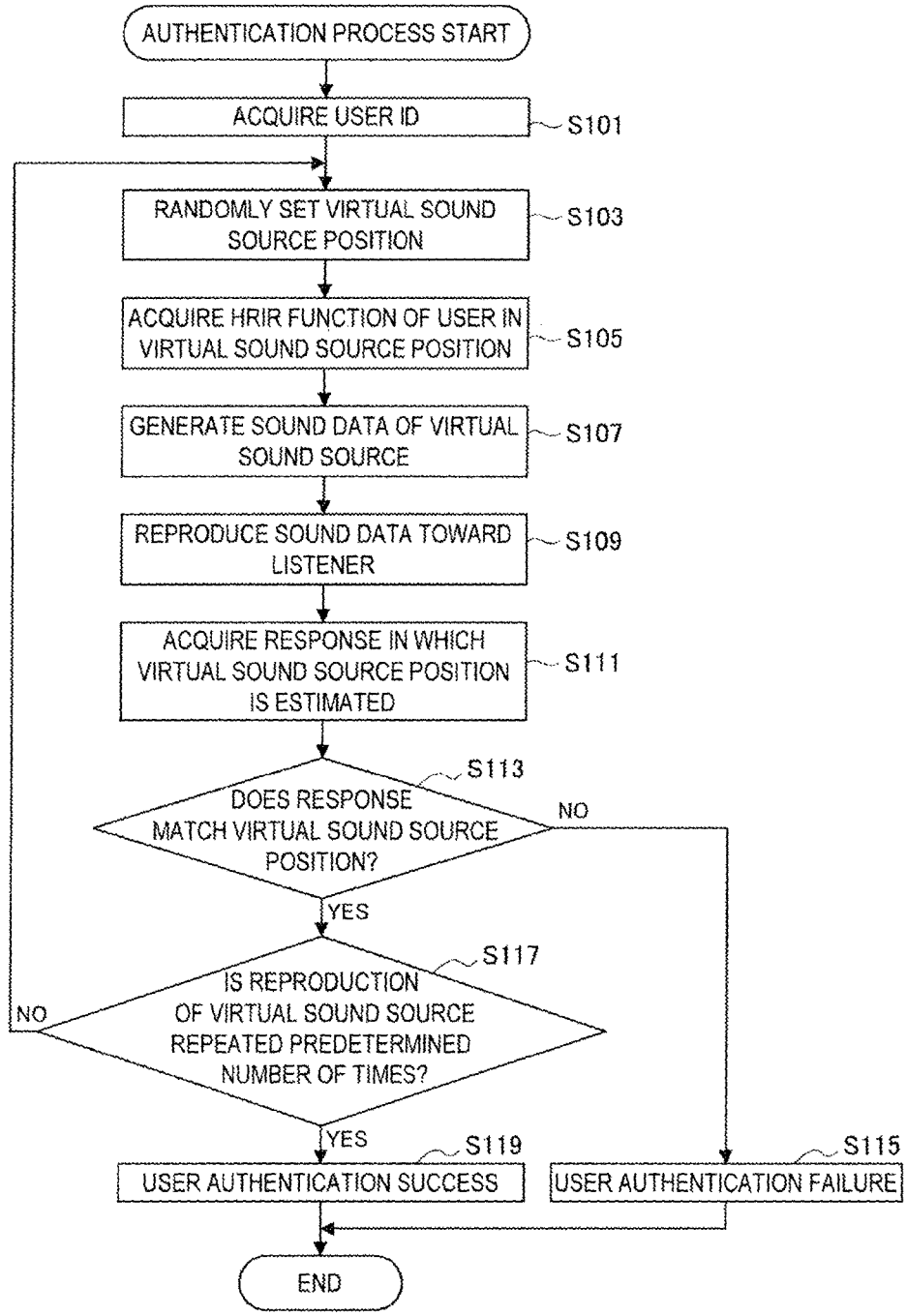
FIG. 12 is a flowchart illustrating steps of a user authentication process in accordance with the first embodiment of the present disclosure.

FIG. 12 is a flowchart illustrating steps of the user authentication process in accordance with the first embodiment of the present disclosure.

First, the ID acquisition unit 101 of the user authentication device 100 acquires a user ID input by the listener using the ID input device 150 (step S101). The virtual sound source position setting unit 107 then randomly sets a virtual sound source position (step S103). Here, the virtual sound source position setting unit 107 randomly selects the virtual sound source position from the positions of the sound sources S₁ to S₉ described above The HRTF acquisition unit 103 then uses the user ID acquired in step S101 to acquire an HRIR function of the user U in the virtual sound source position set in step S103 (step S105). As described above, the acquired HRIR function is measured in advance and then stored as the HRTF data 105.

The generation unit 109 then convolutes the HRIR function acquired in step S105 to original sound data to generate sound data of the virtual sound source (step S107). The reproduction unit 115 then reproduces the sound data toward the listener using the headphone 160 (step S109).

The response acquisition unit 117 then uses the response input device 170 to acquire a response that the listener has estimated the virtual sound source position (step S111). Here, a predetermined standby time is set in consideration of the time associated with the thought and action of the listener between step S109 and step S111.

The authentication unit 119 then determines whether or not the second position indicated by the response acquired in step S111 matches the first position that is the virtual sound source position set in step S103 (step S113). Here, when it is determined that the second position does not match the first position, the authentication unit 119 outputs a result "user authentication failure" through the authentication result output unit 121 (step S115).

On the other hand, when it is determined that the second position matches the first position in step S113, the authentication unit 119 further determines whether or not reproduction of the virtual sound source in step S103 to step S109 is repeated a predetermined number of times (step S117). Here, when it is determined that the reproduction of the virtual sound source is repeated the predetermined number of times, the authentication unit 119 outputs a result "user authentication success" through the authentication result output unit 121 (step S119).

On the other hand, when it is determined that the reproduction of the virtual sound source is not repeated the predetermined number of times in step S117, the reproduction process of the virtual sound source from step S103 is carried out again. In this case, the virtual sound source position can be randomly set again in step S103.

That is, in the present embodiment, reproduction of the virtual sound source and acquisition of the response from the listener are repeated a predetermined number of times by changing the virtual sound source position (the changed position may be the same previous position as a result of random selection). It is thus possible to lower the possibility of another user being incidentally authenticated as the user U.

Figure 13:
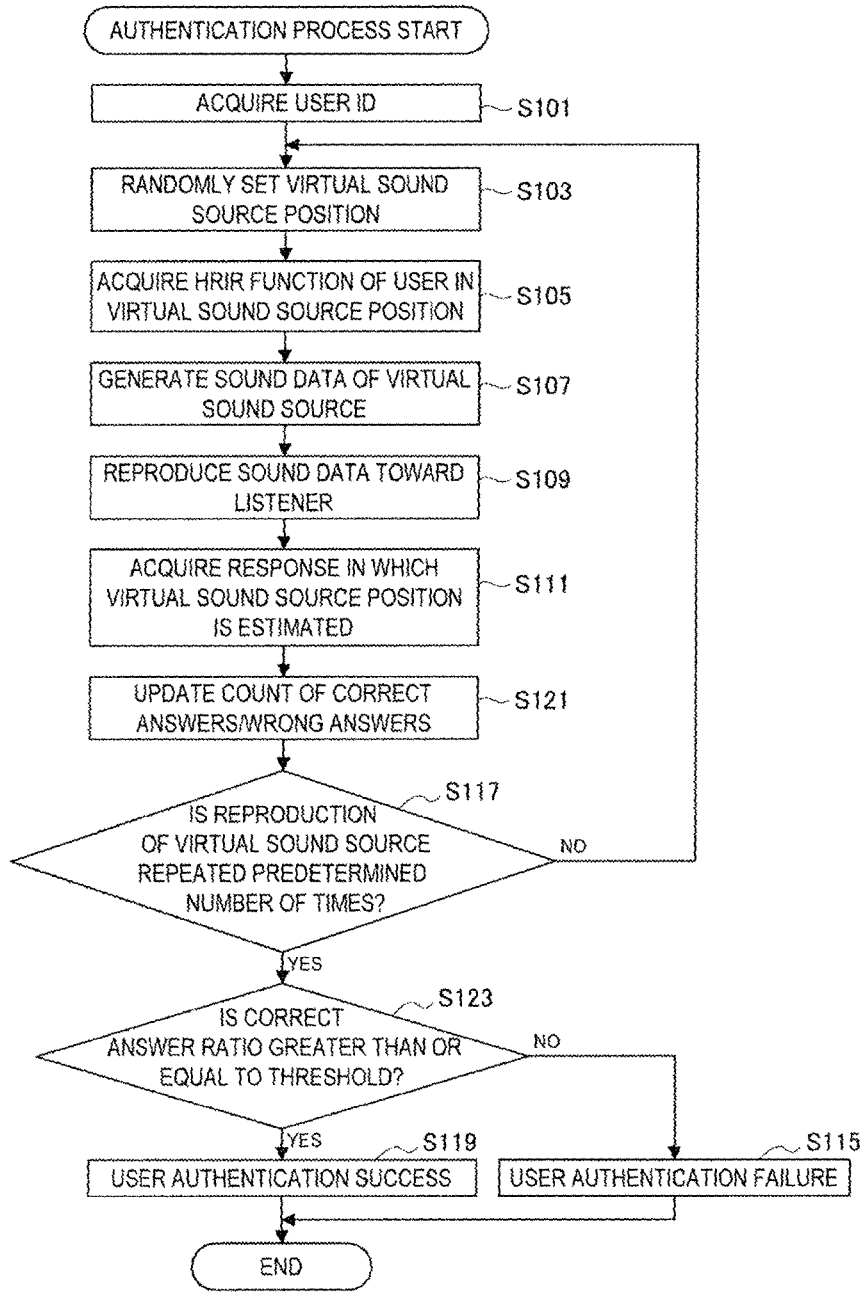
FIG. 13 is a flowchart illustrating steps of a modified example of the process shown in FIG. 12.

FIG. 13 is a flowchart illustrating steps of a modified example of the process shown in FIG. 12.

In the illustrated example, next to step S111, the authentication unit 119 determines whether the acquired response is a correct answer or a wrong answer, and updates the count of the correct answer or the wrong answer (step S121). The counts are stored in a RAM or the like as numerical values. The authentication unit 119 then carries out step S117.

In step S117, when it is determined that the reproduction of the virtual sound source is repeated a predetermined number of times, the authentication unit 119 calculates the predetermined number of times and the number of correct answers of the listener from the counts of the correct answer and the wrong answer, and determines whether the number of correct answers or the correct answer ratio is greater than or equal to a threshold (step S123). Here, when it is determined that the number of correct answers or the correct answer ratio is greater than or equal to the threshold, the authentication unit 119 outputs a result "user authentication success" through the authentication result output unit 121 (step S119). On the other hand, when it is determined that the number of correct answers or the correct answer ratio is not greater than or equal to the threshold, the authentication unit 119 outputs a result "user authentication failure" through the authentication result output unit 121 (step S115).

In the modified example described above, for example, even when the wrong answer occurs one time while the virtual sound source is repeatedly reproduced, the authentication does not fail immediately and there is a possibility of the authentication being successful when the correct answer follows subsequent to the wrong answer. It is thus possible to prevent the user himself or herself from not being authenticated when there is a possibility that the user U himself or herself input the wrong answer because the HRIR function or the headphone 160 is not perfect.

Here, the authentication unit 119 may increase the number of times to repeat the reproduction of the virtual sound source when the wrong answer is detected in step S121. For example, the authentication unit 119 may dynamically set the number of times to repeat the reproduction of the virtual sound source under the conditions of "the response is a correct answer when the correct answers are input three times in a row from the first time or after a wrong answer is input," "the authentication succeeds when the correct answer ratio is 75% or higher and fails when the correct answer ratio is less than 50% after the reproduction of the virtual sound source is repeated three times or more," and so forth.

2-2. Second Embodiment

Next, the second embodiment of the present disclosure will be described with reference to FIG. 14. The present embodiment differs from the first embodiment in that the virtual sound source reproduced using the HRTF of the user U is not binaurally reproduced using the headphone 160 but transaurally reproduced by the speaker 260 included in a transaural system. Other components are the same as in the first embodiment, and the redundant detailed description is thus omitted.

Figure 14:
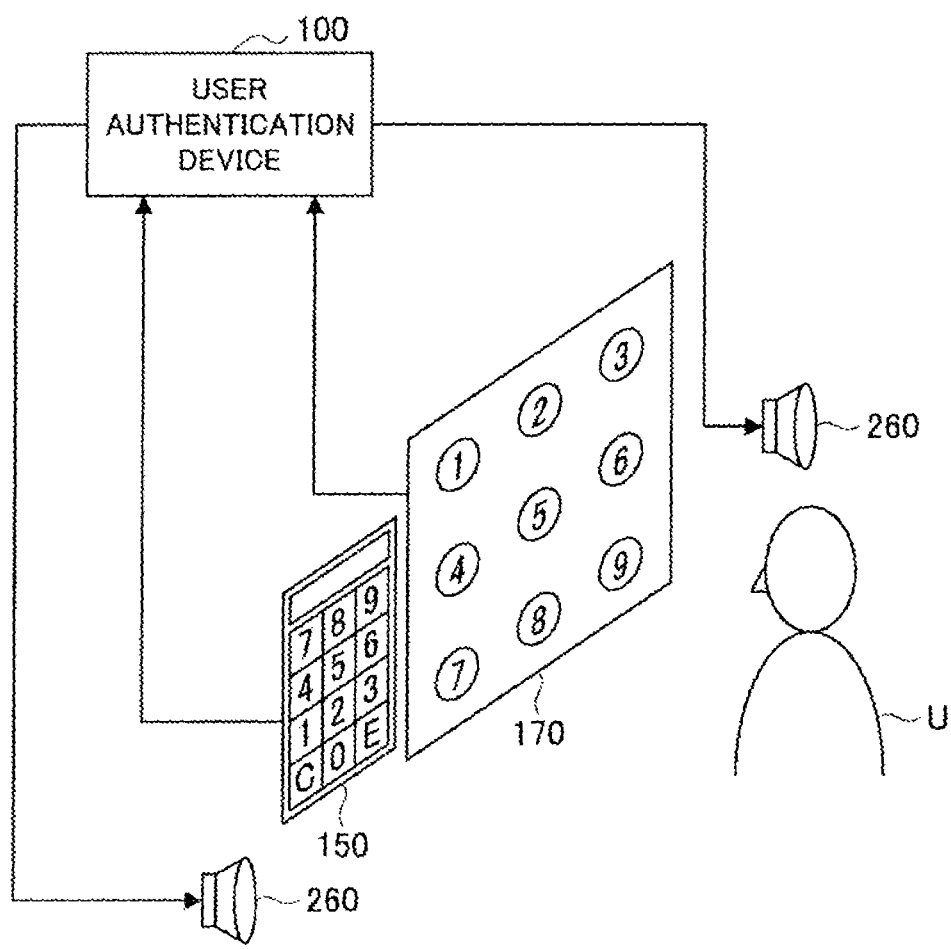
FIG. 14 is a diagram illustrating a configuration of a device used for user authentication in accordance with a second embodiment of the present disclosure.

FIG. 14 is a diagram illustrating a configuration of a device used for the user authentication in accordance with the second embodiment of the present disclosure.

The speaker 260 has a pair of right and left speakers included in the transaural system. In addition, various well-known configurations or the like are applied to the configuration of the transaural system applied to the speaker 260. In a similar way to the binaural reproduction using the headphone 160, the speaker 260 enables the listener to listen to voices reproduced for left and right ears with the ears, respectively.

In the present embodiment, the virtual sound source is transaurally reproduced, and it is thus not necessary for the user U to be authenticated to wear the headphone 160. Therefore, the action for authenticating the user can be further simplified, and a resistance of the user against the living body authentication can be further lowered.

2-3. Third Embodiment

Next, the third embodiment of the present disclosure will be described with reference to FIGS. 15 and 16. The present embodiment differs from the first embodiment in that the user ID and the response to the sound source estimated by the listener are acquired not by the ID input device 150 and the response input device 170 but by a terminal device 300 carried by the listener. Other components are the same as in the first embodiment, and the redundant detailed description is thus omitted.

Figure 15:
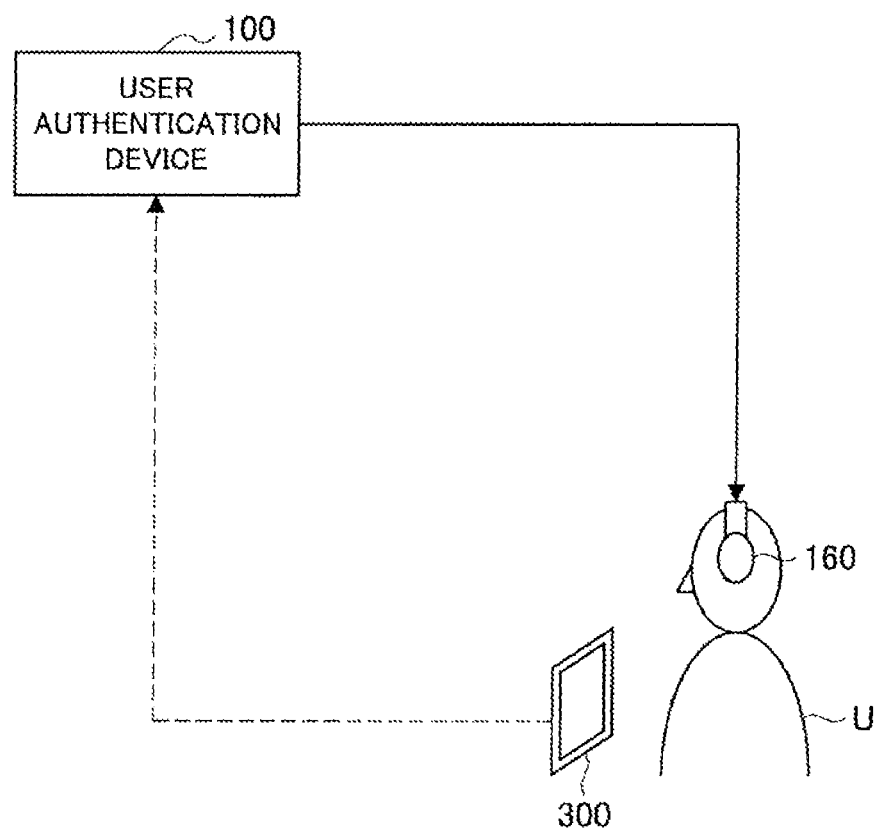
FIG. 15 is a diagram illustrating a configuration of a device used for user authentication in accordance with a third embodiment of the present disclosure.

FIG. 15 is a diagram illustrating a configuration of a device used for the user authentication in accordance with the third embodiment of the present disclosure.

The terminal device 300 is, for example, a terminal device such as a cellular phone and a tablet-type personal computer (PC). The terminal device 300 includes at least an acquisition unit for acquiring operations of the listener and a communication unit for communicating with the user authentication device 100. The listener inputs the user ID and the response using an input unit of the terminal device 300. The terminal device 300 transmits information on the acquired user ID and the response to the user authentication device 100. In the present embodiment, the ID acquisition unit 101 and the response acquisition unit 117 of the user authentication device 100 are implemented by a reception device that receives the information on the acquired user ID and the response from the terminal device 300.

Figure 16:
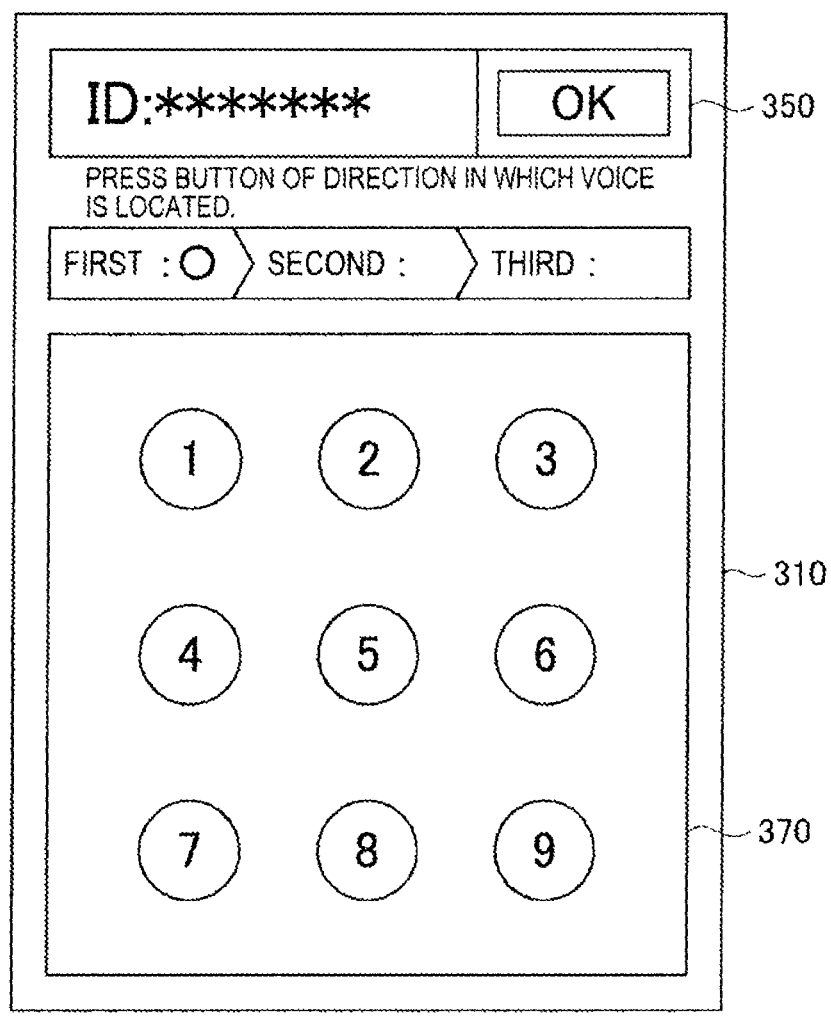
FIG. 16 is a diagram illustrating an example of an input screen of user ID and response in accordance with the third embodiment of the present disclosure.

FIG. 16 is a diagram illustrating an example of an input screen of the user ID and the response in accordance with the third embodiment of the present disclosure.

In the present embodiment, the terminal device 300 has a touch screen 310 as an input unit. A graphical interface including an ID input display 350 and a response input display 370 is displayed in the touch screen 310.

For example, the listener inputs the user ID to the ID input display 350 using an onscreen keyboard, and depresses the button "OK." The terminal device 300 transmits the user ID information to the user authentication device 100, and the user authentication device 100 presents the virtual sound source generated using the HRTF of the user specified by the user ID to the listener through the headphone 160. The listener inputs an estimated position as the virtual sound source position by depressing the buttons "1" to "9" displayed as input candidates in the response Input display 370. The terminal device 300 transmits the response to the user authentication device 100, and the user authentication device 100 then authenticates the listener as the user U in accordance with a coincidence between the set virtual sound source position and the position of the response. In the illustrated example, the virtual sound source is reproduced three times, and the listener is authenticated as the user U when the listener inputs the correct answer three times.

In addition, for example, when the terminal device 300 is dedicated to the user, the user authentication device 100 may hold an equipment ID of the terminal device 300 as information by which the user authentication device 100 identifies the user U, the terminal device 300 may transmit the equipment ID to the user authentication device 100, and inputting the user ID may thus be omitted. In addition, the user authentication device 100 may transmit sound data of the virtual sound source to the terminal device 300, and the virtual sound source may be presented to the listener through the headphone connected to the terminal device 300.

In this case, for example, it is difficult to spatially match the position of the button for response with the virtual sound source position as described above with reference to FIGS. 10 and 11, and the listener may thus be instructed to grasp the terminal device 300 in front of the listener for response. In addition, the input unit of the terminal device 300 is not limited to the touch screen, but may be a combination of the displays and operation buttons or the like. In this case, in order to input the response, a numeric keypad disposed in the cellular phone or the like may be used.

In the present embodiment, the user ID and the response to be input are acquired by the terminal device 300 instead of a dedicated input device. It is thus possible to make the configuration of the user authentication device simple.

In addition, as a modified example of the present embodiment, the virtual sound source may be transaurally reproduced and presented to the user by the speaker 260 in a similar way to the second embodiment described above. Therefore, a user action for authentication can be simplified, the authentication can be made only with the contact with the terminal device 300 owned by the user himself or herself, and the resistance of the user against the living body authentication can thus be further lowered.

2-4. Fourth Embodiment

Next, the fourth embodiment of the present embodiment will be described with reference to FIG. 17. The present embodiment differs from the first embodiment in that a terminal device 400 acts as the user authentication device 100, the ID input device 150, and the response input device 170. Other components are the same as in the first embodiment, and the redundant detailed description is thus omitted.

Figure 17:
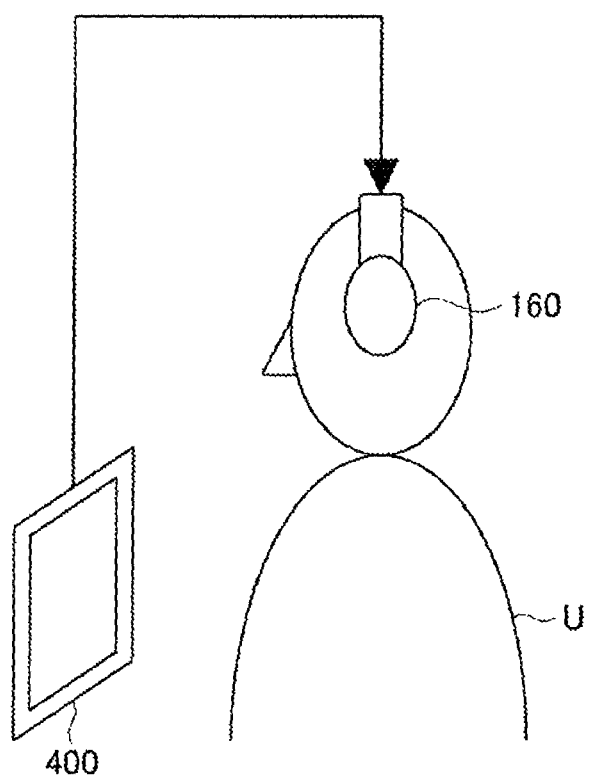
FIG. 17 is a diagram illustrating a configuration of a device used for user authentication in accordance with a fourth embodiment of the present disclosure.

FIG. 17 is a diagram illustrating a configuration of the device used for the user authentication in accordance with the fourth embodiment of the present disclosure.

The terminal device 400 is, for example, a terminal device such as a cellular phone. The terminal device 300 of the third embodiment described above authenticates the user U in communication with the user authentication device 100 disposed in a predetermined place, whereas the terminal device 400 of the present embodiment completes authentication of the user U by virtue of a process of the terminal device 400. For example, the terminal device 400 authenticates the user in order to release the lock state of the terminal device 400. Accordingly, the terminal device 400 is not limited to a portable terminal device, but may be a stationary terminal device such as a desktop PC.

The terminal device 400 has a functional configuration similar to the user authentication device 100 of the first embodiment described above. For example, the ID acquisition unit 101 and the response acquisition unit 117 are implemented by an input device such as a keyboard and a mouse. In addition, functions of the ID acquisition unit 101 and the response acquisition unit 117 may be implemented by causing the terminal device 400 to have a similar touch screen 310 to the terminal device 300 of the third embodiment described above and to display the ID input display 350 and the response input display 370.

For example, when the operation of the locked terminal device 400 is resumed, the user U inputs the user ID, listens to the voice presented by the headphone 160, and responds with the virtual sound source position. When the response is correct, the user U is authenticated, and the locked state of the terminal device 400 is thus released to cause the operation to be possible.

In addition, for example, when the terminal device 400 is dedicated to the user U, inputting the user ID held by the terminal device 400 is omitted. In this case, since information on the HRTF held by the terminal device 400 is limited to the user U, the terminal device 400 may not have the function of the ID acquisition unit 101.

In the present embodiment, the terminal device 400 authenticates the user U using the HRTF and uses the authentication result for itself. This enables the user authentication for lock release or log-in of various devices to be done using the HRTF in a simple and effective way.

In addition, as a modified example of the present embodiment, the virtual sound source may be transaurally reproduced and presented to the user by the speaker of the terminal device 400 in a similar way to the second embodiment. The operation of the user for the authentication is thus further simplified.

3. Supplement (Hardware Configuration)

The hardware configuration of an information processing device 900 that can implement the user authentication device 100 and the terminal devices 300 and 400 in accordance with the aforementioned embodiment of the present disclosure will be described with reference to FIG. 18.

Figure 18:
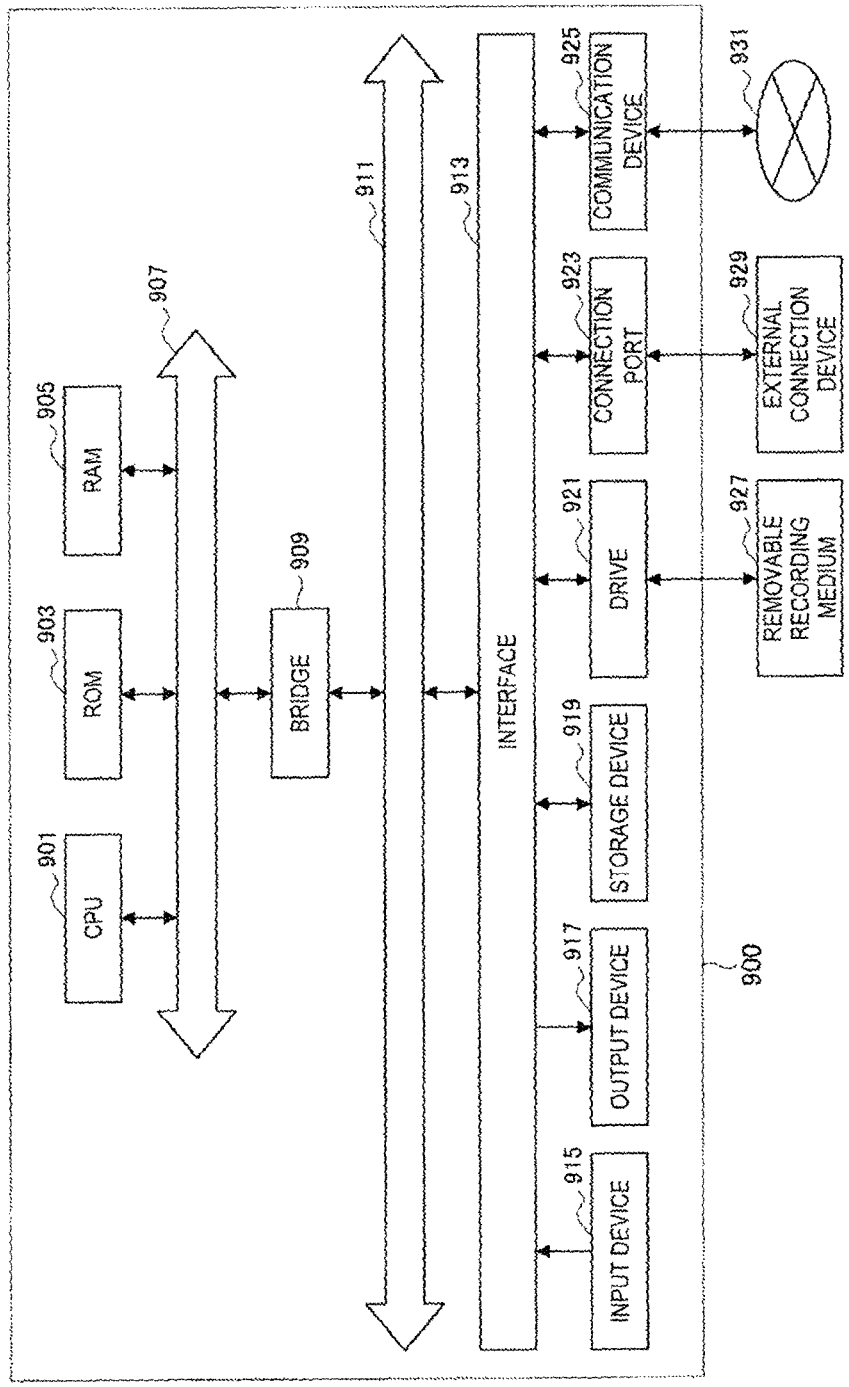
FIG. 18 is a block diagram illustrating a hardware configuration of an information processing device.

FIG. 18 is a block diagram illustrating the hardware configuration of an information processing device.

The information processing device 900 includes a CPU 901, a ROM 903, and a RAM 905. Further, the information processing device 900 may include a host bus 907, a bridge 909, an external bus 911, an interface 913, an input device 915, an output device 917, a storage device 919, a drive 921, a connection port 923, and a communication device 925.

The CPU 901 functions as an arithmetic processing unit and a control unit, and controls the entire operation within the information processing device 900 or a part thereof in accordance with various programs recorded on the ROM 903, the RAM 905, the storage device 919, or the removable recording medium 927. The ROM 903 stores programs, operation parameters, and the like used by the CPU 901. The RAM 905 temporarily stores programs used in the execution of the CPU 901, parameters that change as appropriate during the execution, and the like. The CPU 901, the ROM 903, and the RAM 905 are mutually connected by a host bus 907 constructed from an internal bus such as a CPU bus. Further, the host bus 907 is connected to the external bus 911 such as a PCI (Peripheral Component Interconnect/Interface) via the bridge 909.

The input device 915 is a device used by a user such as, for example, a mouse, a keyboard, a touch panel, a button, a switch, or a lever. The input device 915 may be, for example, a remote control device that uses infrared rays or other radio waves, or an external connection device 929 such as a portable phone corresponding to the operation of the information processing device 900. The input device 915 includes an input control circuit that generates an input signal based on information input by a user and outputs the input signal to the CPU 901. The user can, by operating the input device 915, input various data to the information processing device 900 or instruct the information processing device 900 to perform a processing operation.

The output device 917 includes a device that can visually or audibly inform a user of the acquired information. The output device 917 can be, for example, a display device such as an LCD (liquid crystal display), a PDP (Plasma Display Panel), an organic EL (Electro-Luminescence) display; an audio output device such as a speaker or headphones; or a printer device. The output device 917 outputs the result obtained through the processing of the information processing device 900 as text or video such as an image or as sound such as voice or audio.

The storage device 919 is a device for storing data, constructed as an example of a storage unit of the information processing device 900. The storage device 919 includes, for example, a magnetic storage device such as HDD (Hard Disk Drive), a semiconductor storage device, an optical storage device, or a magneto-optical storage device. This storage device 919 includes, for example, programs or various data executed by the CPU 901 or various data acquired from the outside.

The drive 921 is a reader/writer for a removable recording medium 927 such as a magnetic disk, an optical disc, a magneto-optical disc, or a semiconductor memory, and is incorporated in or externally attached to the information processing device 900. The drive 921 reads information recorded on a removable recording medium 927 that is mounted, and outputs the information to the RAM 905. The drive 921 also writes information to the removable recording medium 927 that is mounted.

The connection port 923 is a port for directly connecting a device to the information processing device 900. The connection port 923 can be, for example, a USB (Universal Serial Bus) port, an IEEE 1394 port, or an SCSI (Small Computer System Interface) port. In addition, the connection port 923 may be an RS-232 port, an optical audio terminal, or an HDMI (High-Definition Multimedia Interface) port. When the external connection device 929 is connected to the connection port 923, the information processing device 900 and the external connection device 929 can exchange various data.

The communication device 925 is, for example, a communication interface including a communication device or the like for connection to a communications network 931. The communication device 925 can be, for example, a wired or wireless LAN (Local Area Network) or a communication card for Bluetooth (registered trademark) or WUSB (Wireless USB). Alternatively, the communication device 925 may be a router for optical communication, a router for ADSL (Asymmetric Digital Subscriber Line), or a modem for various communication. The communication device 925 transmits or receives signals or the like via the Internet or to/from other communication devices, for example, using a predetermined protocol such as TCP/IP. In addition, the communications network 931 connected to the communication device 925 is a network connected by wire or wirelessly, and is, for example, the Internet, a home LAN, infrared communication, radio wave communication, or satellite communication.

An exemplary hardware configuration of the information processing device 900 has been described above. Each of the aforementioned components may be configured using general members or specialized hardware for the function of each component. Such a configuration can be changed as appropriate according to the technology level in implementation.

Other Embodiments

Aside from the embodiments described above, the present disclosure may be embodied by various embodiments.

For example, the user authentication device holds the HRTF of the user in association with the user ID, uses the HRTF to generate sound data, and reproduces the sound data to the user in the embodiments described above. However, the embodiments of the present disclosure are not limited thereto. The user authentication device may hold the sound data generated in advance using the HRTF of the user with respect to respective positions set as the virtual sound source positions in association with the user ID and position information as sound files. In this case, the reproduction unit reproduces the sound data using the sound file selected from sound files that are created in advance and held in accordance with the user ID and the virtual sound source position. The user authentication device can thus exclude the voice data generation unit.

Summary of Effects

Effects that can be obtained by the embodiments of the present disclosure are summarized below. In addition, these effects are not necessarily obtained at the same time, but may be obtained in accordance with the configuration of the embodiment.

Since the HRTF used as the key for user authentication is a function determined by a plurality of characteristics of the user's body such as a shape of the head or ear, acoustic impedance of the skin, or the like instead of information on part of the body, it is very difficult to duplicate. It is thus possible to provide the user authentication with higher safety in accordance with the embodiments described above.

Correct estimation of the virtual sound source position reproduced using the HRTF is empirically learned by a sensory center of the user. For that reason, it is very difficult for a third party to correctly estimate the position of the reproduced sound source even when the third party obtains the HRTF of the user due to leakage or duplication. It is thus possible to prevent the safety from being lowered due to the leakage or duplication of the template in the user authentication of the embodiments described above.

The HRTF is indirectly acquired from physical characteristics of each user. For this reason, a psychological resistance of the user is small in the user authentication of the embodiments described above in comparison with other living body authentication methods of directly taking physical characteristics of the user. In addition, since it is possible for the user not to touch the device that is used in common with other users, for example, a psychological resistance of the user having mysophobia can be lowered.

A device for generating general voices may be used to reproduce the virtual sound source. In addition, an existing terminal device or the like may be employed to input a response from the user. It is thus possible to suppress the cost of the authentication device in the user authentication of the embodiments described above.

CONCLUSION

Preferred embodiments of the present disclosure have been described in detail with reference to accompanying drawings. However, a technical scope of the present disclosure is not limited to the embodiments. It will be understood by those skilled in the art that various changes or modifications are clearly possible and are rightfully encompassed by the technical scope of the present disclosure as provided in the accompanying claims.

Additionally, the present technology may also be configured as below.

(1) A user authentication method comprising:
reproducing sound data of which a sound source in a first position of a space around a user is virtually localized using a Head-Related Transfer Function (HRTF) of the user toward the user;
acquiring a second position of the space around the user, the second position being estimated by the user who has listened to the reproduced sound data as a position of the sound source; and
authenticating the user according to a coincidence between the first position and the second position.

(2) The user authentication method according to (1), wherein the first position is any position of a predetermined position group in the space around the user.

(3) The user authentication method according to (2), wherein the position group includes a plurality of positions having different heights.

(4) The user authentication method according to (2) or (3), wherein the position group includes a position in front of the user.

(5) The user authentication method according to any one of (2) to (4), wherein the second position is a position selected from the position group by the user.

(6) The user authentication method according to (5), wherein the second position is a position selected from the position group by the user using a graphical user interface that displays the position group as an input candidate.

(7) The user authentication method according to any one of (1) to (6), wherein the reproducing and the acquiring are repeatedly carried out, and the user is authenticated when the number of coincidences between the first position and the second position is greater than or equal to a threshold.

(8) The user authentication method according to any one of (1) to (7), wherein the sound data is binaurally reproduced.

(9) The user authentication method according to any one of (1) to (7), wherein the sound data is transaurally reproduced.

(10) The user authentication method according to any one of (1) to (9), wherein the second position is acquired by an input device disposed in the same place as a device for reproducing the sound data.

(11) The user authentication method according to any one of (1) to (9), wherein the second position is acquired by an input into a terminal device possessed by the user.

(12) The user authentication method according to any one of (1) to (11), further comprising:
generating the sound data.

(13) A user authentication device comprising:
a reproduction unit configured to reproduce sound data of which a sound source in a first position of a space around a user is virtually localized using an HRTF of the user toward the user;
a response acquisition unit configured to acquire a second position of the space around the user, the second position being estimated by the user who has listened to the reproduced sound data as a position of the sound source; and an authentication unit configured to authenticate the user according to a coincidence between the first position and the second position.

(14) A program for causing a computer to execute:
a function of reproducing sound data of which a sound source in a first position of a space around a user is virtually localized using an HRTF of the user toward the user;
a function of acquiring a second position of the space around the user, the second position being estimated by the user who has listened to the reproduced sound data as a position of the sound source; and
a function of authenticating the user according to a coincidence between the first position and the second position.

The present application is a continuation of U.S. patent application Ser. No. 13/557,742 filed on Jul. 25, 2012 which claims priority of Japanese Patent Application No. 2011-168897 filed on Aug. 2, 2011 in the Japanese Patent Office, all of which are incorporated herein by reference.

The invention claimed is:

1. An information apparatus, comprising:
circuitry configured to:
reproduce sound data such that a source of the sound data is virtually localized in at least a first position in a space around a user;
acquire at least a first user input that indicates a second position of the source in the space around the user;
randomly change the at least first position at which the source of the sound data is virtually localized;
acquire at least a second user input corresponding to the changed at least first position of the source; and
authenticate the user based on the acquired at least second user input and a number of instances of a match between the changed at least first position of the source and the second position of the source,
wherein the number of instances of the match is greater than or equal to a threshold.

2. The information apparatus of claim 1, wherein the at least first position is at least one position of a position group in the space around the user.

3. The information apparatus of claim 2, wherein the position group includes a plurality of positions having different heights.

4. The information apparatus of claim 2, wherein the at least first position is in front of the user.

5. The information apparatus of claim 2, wherein the position group includes the second position.

6. The information apparatus of claim 5, further comprising a graphical user interface configured to display the position group to the user.

7. The information apparatus of claim 1, wherein the circuitry is further configured to binaurally reproduce the sound data.

8. The information apparatus of claim 1, wherein the circuitry is further configured to transaurally reproduce the sound data.

9. The information apparatus of claim 1, wherein the circuitry is further configured to acquire the at least first user input from an input device that is in a same place as the information apparatus.

10. The information apparatus of claim 1, wherein the circuitry is further configured to acquire the at least first user input from a terminal device of the user.

11. A user authentication method, comprising:
reproducing sound data such that a source of the sound data is virtually localized in at least a first position in a space around a user;
acquiring at least a first user input that indicates a second position of the source in the space around the user;
randomly changing the at least first position at which the source of the sound data is virtually localized;
acquiring at least a second user input corresponding to the changed at least first position of the source; and
authenticating the user based on the acquired at least second user input and a number of instances of a match between the changed at least first position of the source and the second position of the source, wherein the number of instances of the match is greater than or equal to a threshold.

12. The user authentication method of claim 11, wherein the at least first position is at least one position of a position group in the space around the user.

13. The user authentication method of claim 12, wherein the position group includes the second position.

14. The user authentication method of claim 13, further comprising displaying the position group, on a graphical user interface, as an input candidate for selection of the second position.

15. The user authentication method of claim 11, wherein the sound data is one of binaurally reproduced or transaurally reproduced.

16. The user authentication method of claim 11, further comprising acquiring the at least first user input from a terminal device of the user.

17. A non-transitory computer-readable medium having stored thereon computer-executable instructions that, when executed by a processor, cause the processor to execute operations, the operations comprising:
- reproducing sound data such that a source of the sound data is virtually localized in at least a first position in a space around a user;
- acquiring at least a first user input that indicates a second position of the source in the space around the user;
- randomly changing the at least first position at which the source of the sound data is virtually localized;
- acquiring at least a second user input corresponding to the changed at least first position of the source; and
- authenticating the user based on the acquired at least second user input and a number of instances of a match between the changed at least first position of the source and the second position of the source, wherein the number of instances of the match is greater than or equal to a threshold.

18. The non-transitory computer-readable medium of claim 17, further comprising acquiring the second position based on the at least first user input into a terminal device of the user, wherein
- the at least first user input corresponds to selection of the second position from a position group based on a graphical user interface, and
- the graphical user interface displays the position group as an input candidate for the selection.

* * * * *